United States Patent
Lee et al.

(10) Patent No.: US 9,602,249 B2
(45) Date of Patent: *Mar. 21, 2017

(54) METHOD AND DEVICE FOR SETTING BACKHAUL LINK SUBFRAME IN WIRELESS COMMUNICATION SYSTEM HAVING CARRIER AGGREGATION TECHNIQUE APPLIED THERETO

(71) Applicant: LG Electronics Inc., Seoul (KR)

(72) Inventors: Seungmin Lee, Anyang-si (KR); Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,119

(22) Filed: Feb. 17, 2016

(65) Prior Publication Data

US 2016/0164642 A1   Jun. 9, 2016

Related U.S. Application Data

(63) Continuation of application No. 14/810,011, filed on Jul. 27, 2015, now Pat. No. 9,281,921, which is a
(Continued)

(51) Int. Cl.
*H04L 5/00* (2006.01)
*H04L 1/16* (2006.01)
(Continued)

(52) U.S. Cl.
CPC .......... *H04L 1/1678* (2013.01); *H04L 1/1854* (2013.01); *H04L 5/001* (2013.01);
(Continued)

(58) Field of Classification Search
CPC ..... H04L 1/1678; H04L 1/1854; H04L 5/001; H04L 5/0053; H04L 5/0055;
(Continued)

(56) References Cited

U.S. PATENT DOCUMENTS

| 9,083,497 | B2* | 7/2015 | Lee | H04W 72/0406 |
| 9,130,720 | B2* | 9/2015 | Lee | H04W 72/0406 |

(Continued)

FOREIGN PATENT DOCUMENTS

| KR |  | 0126633 B1 | 12/1997 |
| KR | 10-2010-0115714 A |  | 10/2010 |

(Continued)

*Primary Examiner* — Afsar M Qureshi
(74) *Attorney, Agent, or Firm* — Dentons US LLP

(57) ABSTRACT

Disclosed in the present invention is a method for a base station to set a backhaul link subframe for a relay node in a wireless communication system, to which a carrier aggregation technique is applied. More particularly, the present invention comprises the steps of: determining one of the plurality of subframe settings as a first subframe setting for a main component carrier allocated to the relay node; composing subframe setting candidates for one or more subcomponent carriers allocated to the relay node, one the basis of the determined first subframe setting; and determining a second subframe setting for each of the one or more subcomponent carriers, using the composed subframe setting candidates, wherein a subframe aggregation according to the first subframe setting and subframe aggregations according to each of the subframe setting candidates do not overlap when downlink subframes and uplink subframes of the different component carriers are identical, and a downlink subframe aggregation according to the second subframe setting is included in a downlink subframe aggregation according to the first subframe setting.

10 Claims, 13 Drawing Sheets

Related U.S. Application Data continuation of application No. 14/049,000, filed on Oct. 8, 2013, now Pat. No. 9,130,720, which is a continuation of application No. 13/983,745, filed as application No. PCT/KR2012/001535 on Feb. 29, 2012, now Pat. No. 9,083,497.

(60) Provisional application No. 61/499,098, filed on Mar. 4, 2011.

(51) Int. Cl.
| | | |
|---|---|---|
| *H04W 84/04* | (2009.01) | |
| *H04W 72/04* | (2009.01) | |
| *H04L 5/14* | (2006.01) | |
| *H04L 1/18* | (2006.01) | |
| *H04L 1/00* | (2006.01) | |

(52) U.S. Cl.
CPC .......... *H04L 5/0053* (2013.01); *H04L 5/0055* (2013.01); *H04L 5/0092* (2013.01); *H04L 5/1469* (2013.01); *H04W 72/0406* (2013.01); *H04W 84/047* (2013.01); *H04L 2001/0093* (2013.01); *H04L 2001/0097* (2013.01)

(58) Field of Classification Search
CPC ................ H04L 5/0092; H04L 5/1469; H04L 2001/0093; H04L 2001/0097; H04W 72/0406; H04W 84/047
USPC .......................... 370/259, 280, 328, 329, 315
See application file for complete search history.

(56) References Cited

U.S. PATENT DOCUMENTS

| 9,281,921 | B2* | 3/2016 | Lee | H04W 72/0406 |
| 2011/0310986 | A1* | 12/2011 | Heo | H04L 5/001 |
| | | | | 375/259 |
| 2012/0120849 | A1 | 5/2012 | Kazmi et al. | |
| 2012/0147794 | A1* | 6/2012 | Chung | H04W 72/0406 |
| | | | | 370/280 |
| 2012/0320805 | A1* | 12/2012 | Yang | H04L 1/18 |
| | | | | 370/280 |
| 2013/0188589 | A1* | 7/2013 | Nakashima | H04B 7/0404 |
| | | | | 370/329 |
| 2013/0195066 | A1* | 8/2013 | Lee | H04L 1/1607 |
| | | | | 370/329 |
| 2013/0223301 | A1* | 8/2013 | Lee | H04L 5/0055 |
| | | | | 370/281 |
| 2013/0250821 | A1 | 9/2013 | Chun | H04J 11/0079 |
| | | | | 370/280 |
| 2013/0315135 | A1* | 11/2013 | Lee | H04W 72/0406 |
| | | | | 370/315 |

FOREIGN PATENT DOCUMENTS

| KR | 10-2010-0126633 A | 12/2010 |
| WO | 2010-104290 A2 | 9/2010 |
| WO | 2010-123250 A2 | 10/2010 |
| WO | 2010123250 A2 | 10/2010 |
| WO | 2010-129617 A1 | 11/2010 |
| WO | 2010-137839 A2 | 12/2010 |

* cited by examiner

--Prior Art--

FIG. 2
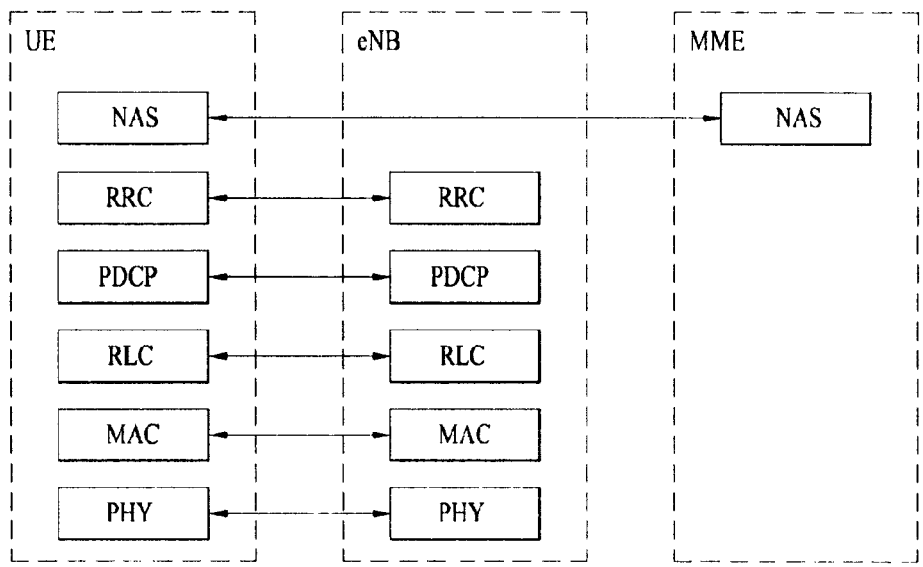
(A) CONTROL-PLANE PROTOCOL STACK
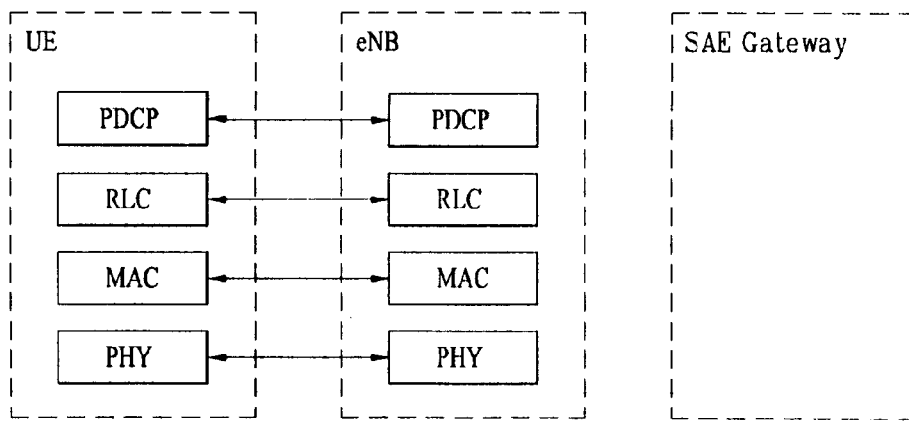
(B) USER-PLANE PROTOCOL STACK

METHOD AND DEVICE FOR SETTING BACKHAUL LINK SUBFRAME IN WIRELESS COMMUNICATION SYSTEM HAVING CARRIER AGGREGATION TECHNIQUE APPLIED THERETO

CROSS-REFERENCE TO RELATED APPLICATIONS

This application is a continuation of, and claims the benefit of, U.S. application Ser. No. 14/810,011, filed Jul. 27, 2015 (now issued as U.S. Pat. No. 9,281,921), which is a continuation of U.S. application Ser. No. 14/049,000, filed Oct. 8, 2013 (now issued as U.S. Pat. No. 9,130,720 issued Sep. 8, 2015), which is a continuation of U.S. application Ser. No. 13/983,745, filed Aug. 5, 2013 (now issued as U.S. Pat. No. 9,083,497 issued Jul. 14, 2015), which is a 35 USC §371 National Stage entry of International Application No. PCT/KR2012/001535 filed on Feb. 29, 2012, and claims the benefit and priority to U.S. Provisional Application No. 61/449,098 filed Mar. 4, 2011, each of which is incorporated by reference in its entirety herein.

TECHNICAL FIELD

The present invention relates to a wireless communication system, and more particularly, to a method and apparatus for configuring a backhaul link subframe in a wireless communication system using carrier aggregation.

BACKGROUND ART

A brief description will be given of a $3^{rd}$ Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on standardization of E-UMTS. E-UMTS is also called an LTE system. For details of the technical specifications of UMTS and E-UMTS, refer to Release 7 and Release 8 of "$3^{rd}$ Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolutions are required to achieve future competitiveness. Specifically, cost reduction per bit, increased service availability, flexible use of frequency bands, a simplified structure, an open interface, appropriate power consumption of UEs, etc. are required.

SUMMARY OF INVENTION

An object of the present invention devised to solve the conventional problem is to provide a method and apparatus for configuring a backhaul link subframe in a wireless communication system using carrier aggregation.

In an aspect of the present invention, a method for configuring a backhaul link subframe for a relay node at a base station in a wireless communication system using carrier aggregation includes determining one of a plurality of subframe configurations as a first subframe configuration for a primary component carrier allocated to the relay node, determining subframe configuration candidates for one or more secondary component carriers allocated to the relay node according to the determined first subframe configuration, determining a second subframe configuration for each of the one or more secondary component carriers from among the determined subframe configuration candidates, and transmitting and receiving a signal to and from the relay node according to the first and second subframe configurations. A downlink subframe set of the second subframe configuration is included in a downlink subframe set of the first subframe configuration.

In another aspect of the present invention, a base station in a wireless communication system using carrier aggregation includes a processor for determining one of a plurality of subframe configurations as a first subframe configuration for a primary component carrier allocated to the relay node, determining subframe configuration candidates for one or more secondary component carriers allocated to the relay node according to the determined first subframe configuration, and determining a second subframe configuration for each of the one or more secondary component carriers from among the determined subframe configuration candidates, and a wireless communication module for transmitting and receiving a signal to and from the relay node according to the first and second subframe configurations. A downlink subframe set of the second subframe configuration is included in a downlink subframe set of the first subframe configuration.

The plurality of subframe configurations may be divided into a plurality of groups each group including one or more subframe configurations and the first and second subframe configurations may belong to the same group.

Downlink subframes and uplink subframes of different component carriers may not be overlapped at the same time points in a subframe set of the first subframe configuration and a subframe set of each of the subframe configuration candidates.

A downlink control channel transmitted to the relay node on the primary component carrier may include information required to schedule at least one of a downlink data channel transmitted to the relay node on the one or more secondary component carriers and an uplink data channel received from the relay node on the one or more secondary component carriers.

In this case, the index #n of a subframe carrying the downlink data channel on the one or more secondary component carriers may be identical to the index of a subframe carrying the downlink control channel on the primary component carrier.

An uplink ACKnowledgement/Negative ACKnowledgement (ACK/NACK) for the downlink data channel transmitted on the one or more secondary component carriers may be transmitted in a specific uplink subframe of the primary component carrier according to the first subframe configuration, corresponding to the index #n of a subframe carrying the downlink data channel on the one or more secondary component carriers.

The specific uplink subframe of the primary component carrier may be an uplink subframe of the primary component carrier corresponding to an ACK/NACK transmission timing of a downlink subframe #m (m≥n) of the primary component carrier, and the downlink subframe #m of the primary component carrier may be a downlink subframe of the primary component carrier, closest to the subframe #n carrying the downlink data channel on the one or more secondary component carriers.

Or the specific uplink subframe of the primary component carrier may be an uplink subframe of the primary component carrier, which has an index #(n+k) (k is an integer equal to or larger than 4) from among uplink subframes of the primary component carrier according to the first subframe configuration and is closest to the subframe #n carrying the downlink data channel on the one or more secondary component carriers.

According to the embodiments of the present invention, a backhaul link subframe can be effectively configured in a wireless communication system using carrier aggregation.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 2 illustrates a control-plane protocol stack and a user-plane protocol stack in a radio interface protocol architecture conforming to a $3^{rd}$ Generation Partnership Project (3GPP) radio access network standard between a User Equipment (UE) and an Evolved UMTS Terrestrial Radio Access Network (E-UTRAN);

DETAILED DESCRIPTION OF THE INVENTION

Figure 1:
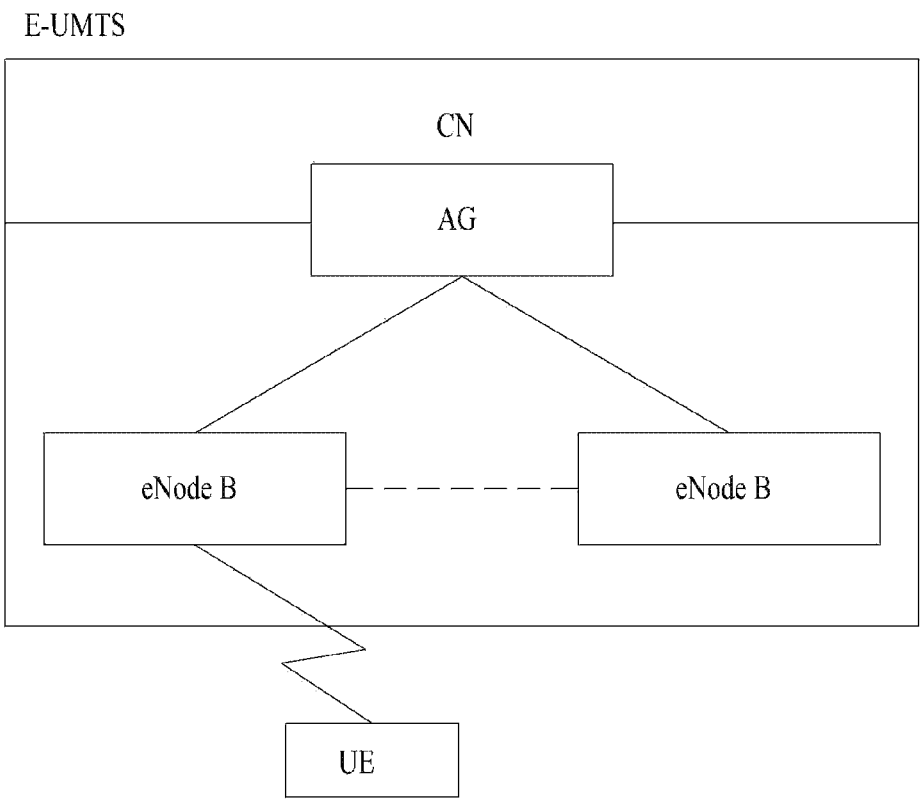
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a $3^{rd}$ Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1)) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell covered by an eNB is set to one of the bandwidths of 1.25, 2.5, 5, 10, 15, and 20 MHz and provides downlink or uplink transmission service in the bandwidth to a plurality of UEs. Different cells may be set to provide different bandwidths.

Downlink transport channels used to deliver data from the E-UTRAN to UEs include a Broadcast Channel (BCH) carrying system information, a Paging Channel (PCH) carrying a paging message, and a Shared Channel (SCH) carrying user traffic or a control message. Downlink multicast traffic or control messages or downlink broadcast traffic or control messages may be transmitted on a downlink SCH or a separately defined downlink Multicast Channel (MCH). Uplink transport channels used to deliver data from a UE to the E-UTRAN include a Random Access Channel (RACH) carrying an initial control message and an uplink SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
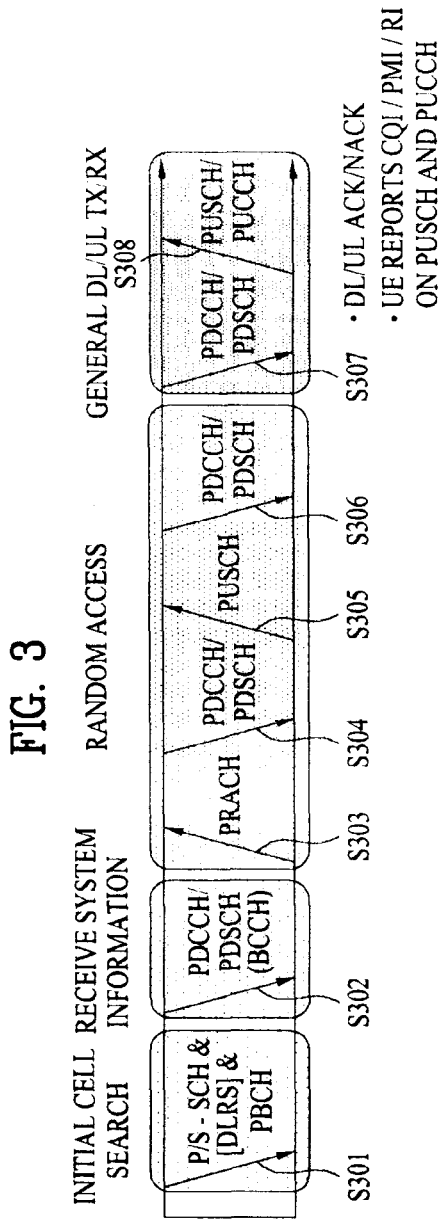
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general downlink and uplink signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the uplink or receives from the eNB on the downlink includes a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
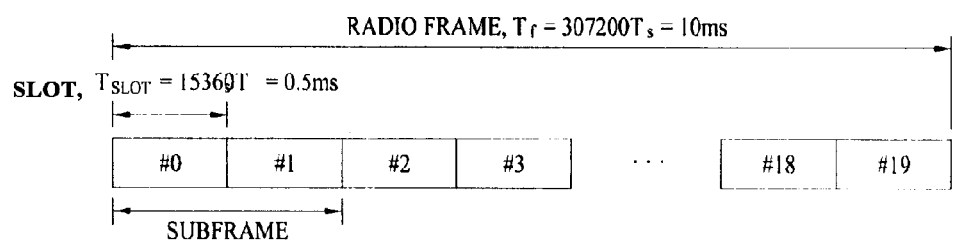
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of OFDM symbols or SC-FDMA symbols in the time domain by a plurality of Resource Blocks (RBs) in the frequency domain. In the LTE system, one RB includes 12 subcarriers by 7 (or 6) OFDM symbols. A unit time in which data is transmitted is defined as Transmission Time Interval (TTI). The TTI may be defined as one or more subframes. The above-described radio frame structure is purely exemplary and thus the number of subframes in a radio frame, the number of slots in a subframe, or the number of OFDM symbols in a slot may vary.

Figure 5:
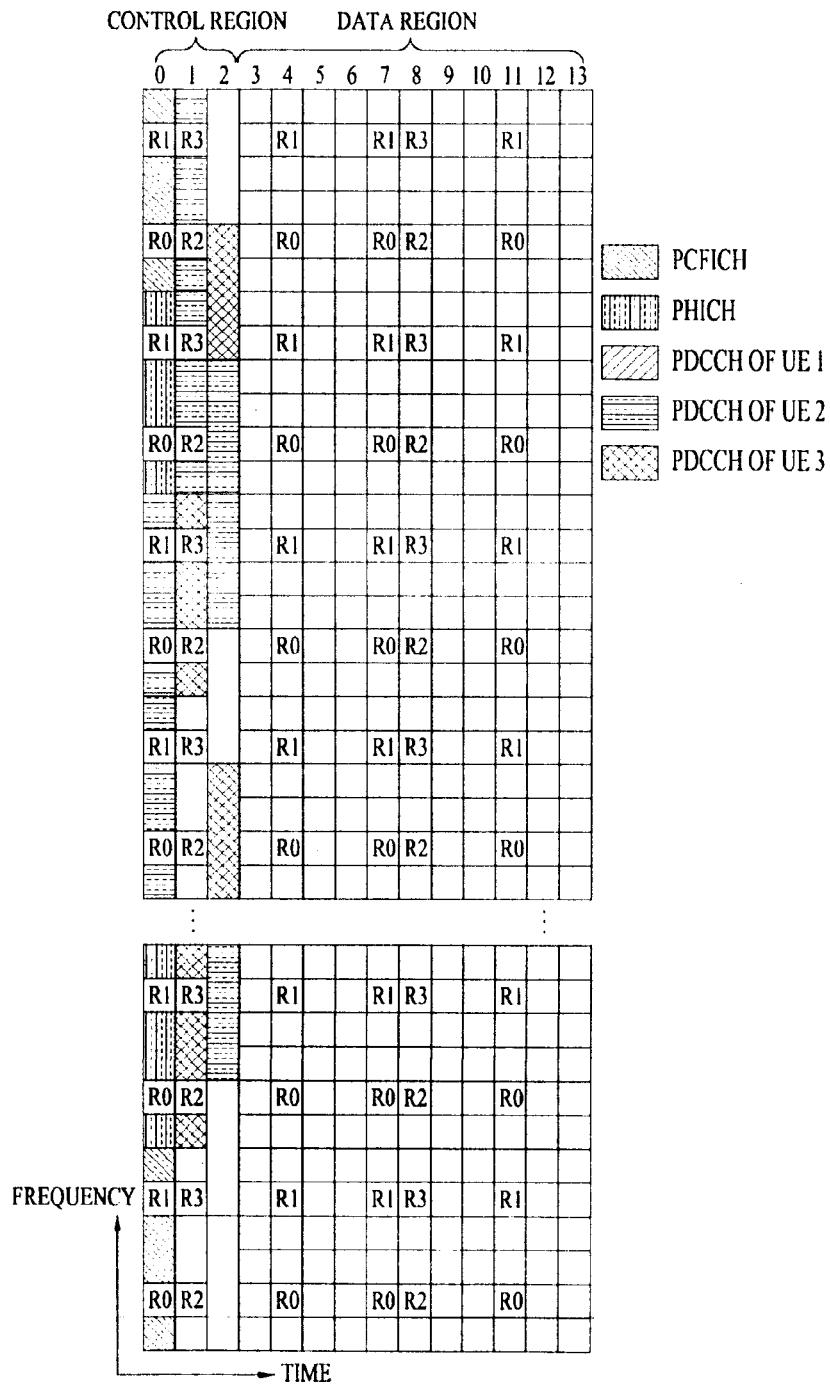
FIG. 5 illustrates a structure of a downlink radio frame in the LTE system.

FIG. 5 illustrates an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH indicates 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Herein, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors a PDCCH using its RNTI information. If one or more UEs have RNTI "A", these UEs receive the PDCCH and receive a PDSCH indicated by "B" and "C" based on information of the received PDCCH.

Meanwhile, when the channel state between an eNB and a UE is poor, a Relay Node (RN) is installed between them to provide a better radio channel to the UE. In addition, use of an RN at a cell area where a channel from an eNB is in poor state can provide a high-speed data channel and extend cell service coverage. RNs have been introduced to eliminate shadowing areas and are widely deployed in a wireless communication system.

Conventionally, relaying was confined to the function of a repeater that simply amplifies a signal and forwards the amplified signal. However, more intelligent relay schemes have recently been developed. Furthermore, relaying is a requisite technology to reduce eNB installation cost and backhaul maintenance cost, while extending service coverage and increasing data throughput in a future-generation mobile communication system. Along with the growth of relaying techniques, there exists a need to support an RN used in a conventional wireless communication system for a new wireless communication system.

In a 3GPP LTE-A system, with the introduction of a function of relaying a signal on a link between an eNB and a UE to an RN, two links having different attributes apply to each of DL and UL carrier frequency bands. A link between the eNB and the RN is defined as a backhaul link. A backhaul link through which a signal is transmitted using downlink resources in Frequency Division Duplexing (FDD) or Time Division Duplexing (TDD) is called a backhaul downlink, whereas a link through which a signal is transmitted using uplink resources in FDD or TDD is called a backhaul uplink.

Figure 6:
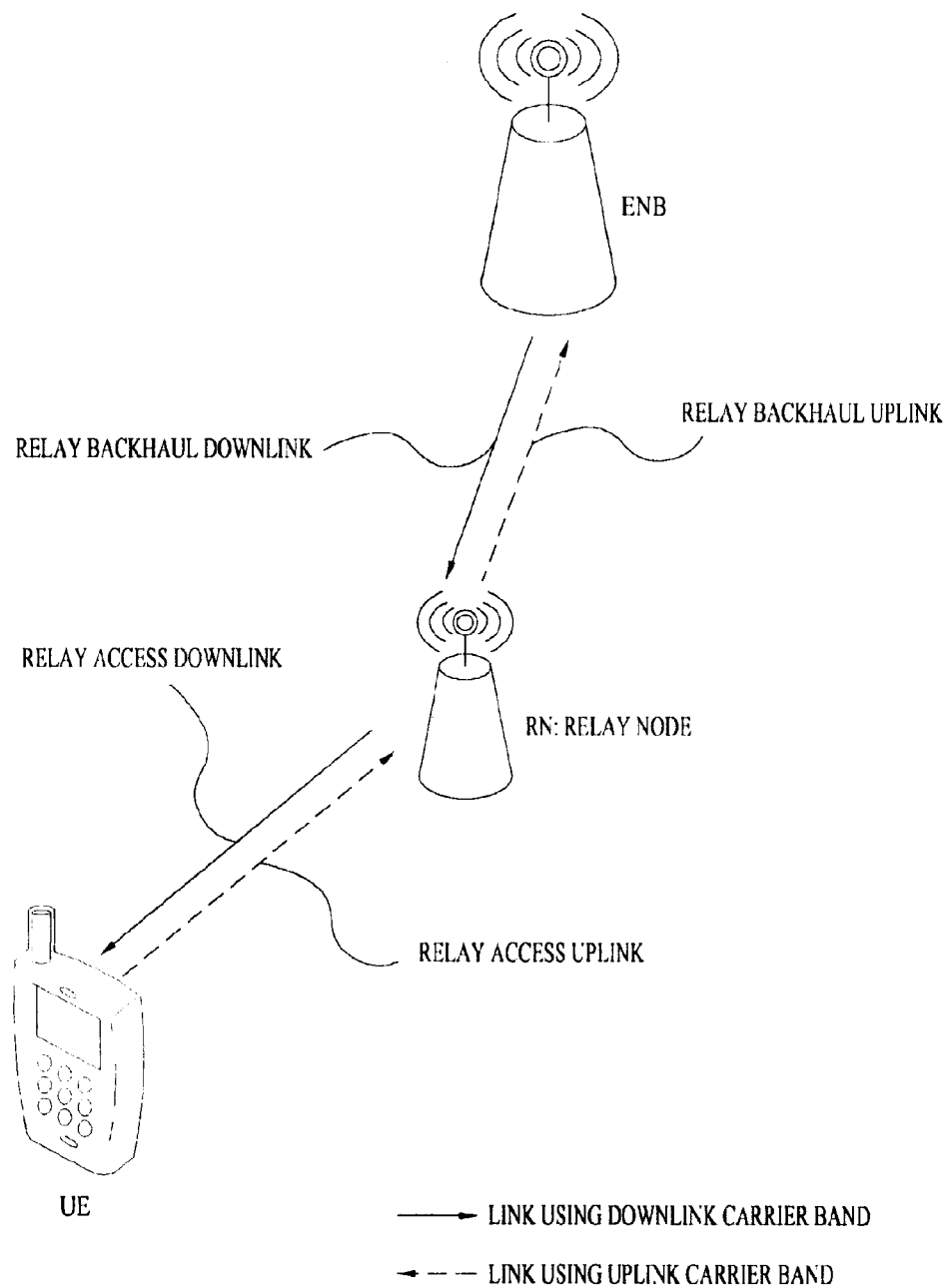
FIG. 6 illustrates a configuration of a relay backhaul link and a relay access link in a wireless communication system.

FIG. 6 illustrates a configuration of a relay backhaul link and a relay access link in a wireless communication system.

Referring to FIG. 6, with the introduction of a function of forwarding a signal on a link between an eNB and a UE to an RN, two links having different attributes apply to each of downlink and uplink carrier frequency bands. A link between the eNB and the RN is defined as a backhaul link. A backhaul link through which a signal is transmitted using downlink resources in FDD or TDD is called a backhaul downlink, whereas a link through which a signal is transmitted using uplink resources in FDD or TDD is called a backhaul uplink.

Meanwhile, a link between an RN and a UE is defined as a relay access link. A relay access link through which a signal is transmitted in a downlink frequency band (in case of FDD) or in downlink subframe resources (in case of TDD) is called an access downlink, whereas a relay access link through which a signal is transmitted in an uplink frequency band (in case of FDD) or in uplink subframe resources (in case of TDD) is called an access uplink.

An RN may receive information from an eNB through a relay backhaul downlink and transmit information to the eNB through a relay backhaul uplink. In addition, the RN may transmit information to a UE through a relay access downlink and receive information from the UE through a relay access uplink.

With respect to an RN's usage of a frequency band (or spectrum), its operation can be classified into in-band and out-band. For an in-band RN, a backhaul link shares the same frequency band with an access link. If the backhaul link and the access link operate in different frequency bands, the RN is an out-band RN. In both in-band and out-band relaying, a UE (legacy UE) operating in the conventional LTE system (e.g. Release-8) should be able to access a donor cell.

Depending on whether a UE is aware of the existence of an RN, RNs may be classified into a transparent RN and a non-transparent RN. If the UE does not perceive whether it communicates with a network via an RN, the RN is a transparent RN. In contrast, if the UE perceives whether it communicates with a network via an RN, the RN is a non-transparent RN.

In relation to control of RNs, RNs may be classified into an RN configured as a part of a donor cell and an RN that self-controls a cell.

The former RN may have an RN ID, although it does not have its own cell ID. If at least a part of Radio Resource Management (RRM) of an RN is controlled by an eNB covering the donor cell, the RN is regarded as configured as a part of the donor cell (even though the other parts of the RRM reside in the RN). Preferably, this RN can support legacy UEs (e.g. LTE UEs). For instance, smart repeaters, decode-and-forward relays, various types of L2 RNs, and type-2 RNs form a part of a donor cell.

The latter RN controls one or more cells. The cells are allocated their unique physical cell IDs and they may use the same RRM mechanism. From the viewpoint of a UE, there is no distinction between accessing a cell controlled by an RN and accessing a cell controlled by a Macro eNB (MeNB). Preferably, a cell controlled by this type of RN may support legacy UEs. For example, RNs of this type include self-backhauling RNs, L3 RNs, type-1 RNs, and type-1a RNs.

A type-1 RN is an in-band RN that controls a plurality of cells. Each of the plurality of cells appears to a UE as a separate cell distinct from a donor cell. The plurality of cells have their own physical cell IDs (as defined in LTE Release-8) and the RN can transmit its own synchronization channels, RSs, etc. During a single-cell operation, a UE may receive scheduling information and an HARQ feedback directly from the RN and transmit its control channels (a Scheduling Request (SR), a CQI, an ACK/NACK, etc.) to the RN. The type-1 RN appears as a legacy eNB (operating in conformance to LTE Release-8) to a legacy UE (conforming to LTE Release-8). That is, the type-1 RN has backward compatibility. On the other hand, to LTE-A UEs, the type-1 RN appears different from a legacy eNB. Thus the type-1 RN can enhance performance.

Except for its out-band operation, a type-1a RN is characterized by the same set of features as the type-1 RN. The type-1a RN may be configured such that the influence of its operation on an L1 operation is minimized or eliminated.

A type-2 RN is an in-band RN that does not have its own physical cell ID and thus does not form a new cell. Since the type-2 RN is transparent to legacy UEs, the legacy UEs do not notice the existence of the type-2 RN. The type-2 RN can transmit a PDCCH but does not transmit at least a Common RS (CRS) and a PDCCH.

In order to allow in-band relaying, some resources in the time-frequency domain should be set aside for a backhaul link and these resources may be set not to be used for an access link. This is called resource partitioning.

A description will be given of the general principle of resource partitioning for an RN. A backhaul downlink and an access downlink may be TDM-multiplexed in one carrier frequency (that is, only one of the backhaul downlink and the access downlink is activated at a specific time). Similarly, a backhaul uplink and an access uplink may be TDM-multiplexed in one carrier frequency (that is, only one of the backhaul uplink and the access uplink is activated at a specific time).

Multiplexing of backhaul links in FDD is performed such that backhaul downlink transmission and backhaul uplink transmission take place in a downlink frequency band and an uplink frequency band, respectively. In comparison, multiplexing of backhaul links in TDD is performed such that backhaul downlink transmission and backhaul uplink transmission take place in a downlink subframe between an eNB and an RN and an uplink subframe between the eNB and the RN, respectively.

In the case of an in-band RN, for example, if backhaul downlink reception from an eNB and access downlink transmission to a UE are performed simultaneously in the same frequency band, a signal transmitted from the transmitter of the RN may be received at the receiver of the RN. As a result, signal interference or Radio Frequency (RF) jamming may occur at the RF front-end of the RN. Likewise, if access uplink reception from a UE and backhaul uplink transmission to an eNB take place simultaneously in the same frequency band, the RF front-end of the RN may experience signal interference. Therefore, simultaneous eNB-to-RN and RN-to-UE transmissions in the same frequency band may not be feasible unless a reception signal and a transmission signal are sufficiently isolated from each other (e.g. a Transmission (Tx) antenna is geographically apart enough from a Reception (Rx) antenna (e.g. installed on the ground/underground)).

One way to handle the signal interference is to operate the RN such that while the RN is receiving a signal from a donor cell, it is not transmitting signals to UEs. That is, a gap is created in the RN-to-UE transmission and UEs (including legacy UEs) are not supposed to expect any RN transmission during the gap. This gap may be created by configuring a Multicast Broadcast Single Frequency Network (MBSFN) subframe.

Figure 7:
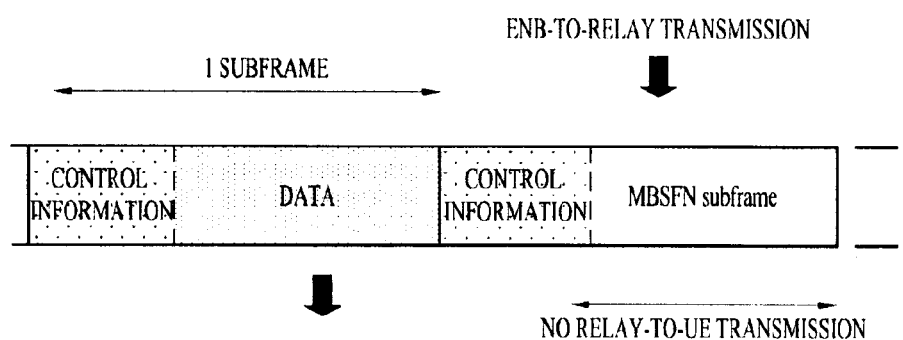
FIG. 7 illustrates an example of relay node resource partitioning.

FIG. 7 illustrates an example of RN resource partitioning.

In FIG. 7, a first subframe is a general subframe in which an RN transmits a downlink (i.e. an access downlink) control signal and data to a UE and a second subframe is an MBSFN subframe in which the RN transmits a control signal to a UE in the control region of a DL subframe but no transmission occurs from the RN to a UE in the other region of the DL subframe. Since a legacy UE expects PDCCH transmission in every DL subframe (in other words, the RN needs to allow legacy UEs within its area to receive a PDCCH in each subframe and thus support a measurement function), it is necessary to transmit a PDCCH in every DL subframe to ensure reliable operations of legacy UEs. Therefore, the RN needs access downlink transmission in the first N (N=1, 2 or 3) OFDM symbols of even a subframe (a second subframe 1020) configured for downlink (i.e. backhaul downlink) transmission from an eNB to the RN, instead of backhaul downlink reception. Since the RN transmits a PDCCH to UEs in the control region of the second subframe, backward compatibility may be provided to legacy UEs served by the RN. The RN may receive a signal from the eNB in the remaining region of the second subframe in which no transmission occurs from the RN to UEs. Thus, an in-band RN does not perform access downlink transmission and backhaul downlink reception simultaneously by the above-described resource partitioning.

The second subframe using an MBSFN subframe will be described in detail. The control region of the second subframe may be referred to as an RN non-hearing period. An RN transmits an access downlink signal without receiving a backhaul downlink signal in the RN non-hearing period. The RN non-hearing period may have 1, 2 or 3 OFDM symbols. The RN may transmit an access downlink signal to a UE in the RN non-hearing period and receive a backhaul downlink signal from an eNB in the other period. Since the RN cannot perform transmission and reception simultaneously in the same frequency band, time is taken for the RN to switch from Tx mode to Rx mode. Therefore, a Guard Time (GT) needs to be set in a starting part of the backhaul downlink reception area, for Tx/Rx mode switching of the RN. Similarly, when the RN receives a backhaul downlink signal from the eNB and transmits an access downlink signal to a UE, a GT may be set for Rx/Tx mode switching of the RN. The length of a GT may be a time-domain value, for example, k (k≥1) time samples ($T_s$) or one or more OFDM symbols. Or when RN backhaul downlink subframes are successively configured or according to a predetermined subframe timing alignment relationship, a GT may not be defined or set at the end of a subframe. To maintain backward compatibility, a GT may be defined only in a frequency area set for backhaul downlink subframe transmission (if a GT is set in an access downlink period, legacy UEs cannot be supported). The RN may receive a PDCCH and a PDSCH from the eNB in the backhaul downlink reception period except for the GT. The PDCCH and PDSCH may be called an R-PDCCH and an R-PDSCH to indicate that they are RN dedicated physical channels.

Figure 8:
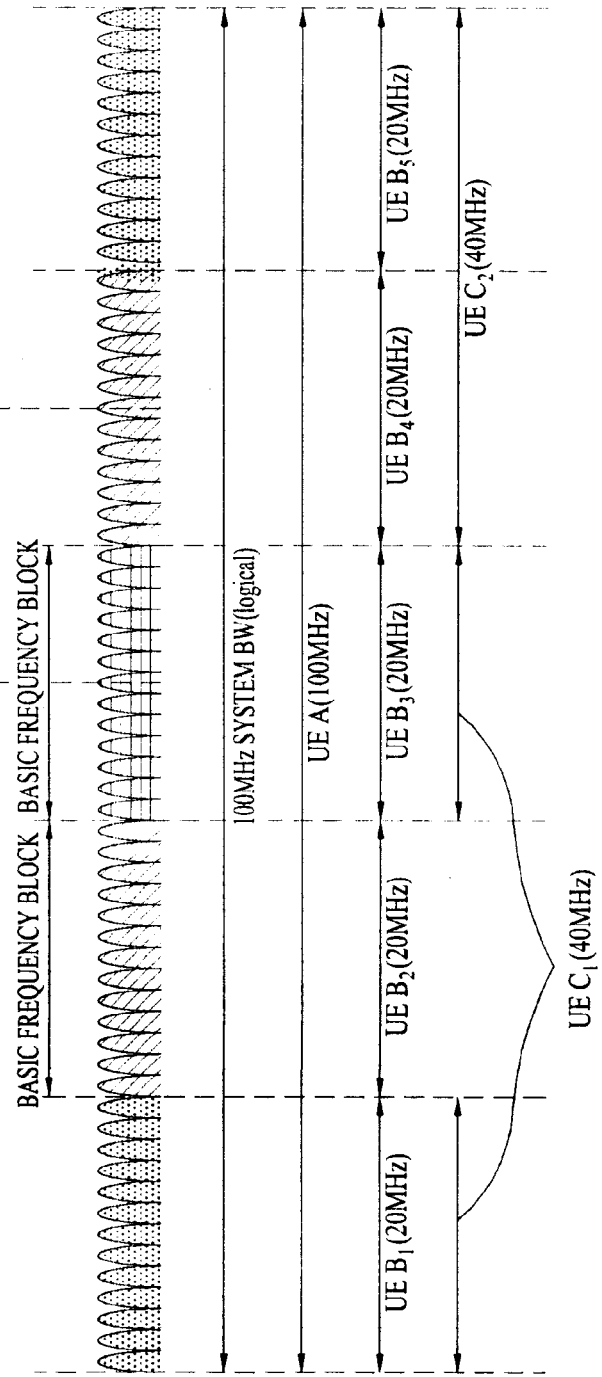
FIG. 8 illustrates the concept of carrier aggregation.

Now, carrier aggregation will be described below. FIG. 8 illustrates the concept of carrier aggregation.

Carrier aggregation refers to aggregation of a plurality of frequency blocks or cells (in the logical sense of the term) including uplink resources (or UL Component Carriers (CCs)) and/or downlink resources (or DL CCs) into one broad logical frequency band at a UE in order to a use broader frequency band in a wireless communication system. For clarity of description, the term CC will be used uniformly.

Referring to FIG. 8, a total system band is a logical band having a bandwidth of up to 100 MHz. The system band includes five CCs, each CC having a bandwidth of up to 20 MHz. A CC includes one or more contiguous physical subcarriers. While each CC is shown as having the same bandwidth in FIG. 8 by way of example, each CC may have a different bandwidth. In addition, while the CCs are shown as adjacent to each other in the frequency domain, this configuration is logical. Therefore, the CCs may be contiguous or non-contiguous physically.

Each CC may have a different center frequency or physically adjacent CCs may have a common center frequency. For example, if all CCs are physically contiguous, they may commonly have center frequency A. On the other hand, if the CCs are not contiguous physically, the CCs may have different center frequencies A, B, etc.

In the disclosure, a CC may correspond to the system band of a legacy system. Backward compatibility and system design may be facilitated in a wireless communication environment in which evolved UEs coexist with legacy UEs, by defining a CC from the perspective of the legacy system. For example, when the LTE-A system supports carrier aggregation, each CC may correspond to the system band of the LTE system. In this case, a CC may have one of the bandwidths, 1.25, 2.5, 5, 10, and 20 MHz.

When a total system band is extended by carrier aggregation, a frequency band used for communication with a UE is defined in units of a CC. A total system bandwidth, 100 MHz may be available to UE A and thus UE A may communicate using five CCs. Only 20 MHz may be available to each of UEs $B_1$ to $B_5$ and thus each of UEs $B_1$ to $B_5$ may use one CC, for communication. Each of UEs $C_1$ and $C_2$ may use 40 MHz and thus may communicate in two CCs. The two CCs may or may not be contiguous logically/physically. In the illustrated case of FIG. 8, UE $C_1$ uses two non-contiguous CCs, whereas UE $C_2$ uses two contiguous CCs.

The LTE system uses one DL CC and one UL CC, whereas the LTE-A system may use a plurality of CCs as illustrated in FIG. 8. A data channel may be scheduled by a control channel by conventional linked carrier scheduling or cross carrier scheduling.

In linked carrier scheduling, a control channel transmitted in a specific CC schedules only a data channel of the specific CC, as in the legacy LTE system using a single CC.

In cross carrier scheduling, a control channel transmitted in a primary CC schedules a data channel transmitted in the primary CC or any other CC by means of a Carrier Indicator Field (CIF).

The present invention provides a method for efficiently determining a subframe configuration for each cell (or each CC) defined in a logical sense, when CA is used for a backhaul link between an MeNB and an RN. The method described below is applicable to an RN and a UE of the RN (referred to as an RUE) and further to an MeNB and a UE of the MeNB (referred to as an MUE).

In a 3GPP LTE TDD system, the following subframe configurations are defined for a backhaul link, as illustrated in [Table 1].

TABLE 1

| SubframeConfigurationTDD | eNB-RN uplink-downlink configuration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | | | | D | | | | U | | |
| 1 | | | | U | | | | | | | D |
| 2 | | | | | D | | | | U | D | |
| 3 | | | | U | D | | | | | | D |
| 4 | | | | U | D | | | | U | D | |
| 5 | 2 | | | U | | | | | | | D |
| 6 | | | | | D | | | | U | | |
| 7 | | | | U | D | | | | D | | |
| 8 | | | | | D | | | | U | | D |
| 9 | | | U | D | D | | | | D | | |
| 10 | | | | | D | | | | U | D | D |
| 11 | 3 | | | U | | | | | D | | D |
| 12 | | | | U | | | | | D | D | D |
| 13 | 4 | | | U | | | | | | | D |
| 14 | | | | U | | | | | D | | D |
| 15 | | | | U | | | | | | D | D |
| 16 | | | | U | | | | | D | D | D |
| 17 | | | | U | D | | | | D | D | D |
| 18 | 6 | | | | | | U | | | | D |

In [Table 1], U represents a backhaul uplink subframe and D represents a backhaul downlink subframe.

An RN for which a UL-DL subframe configuration has been determined according to [Table 1] detects a PDSCH in subframe n−κ (κ∈K) in order to transmit an ACK/NACK response in uplink subframe n. K is defined as [Table 2] below.

TABLE 2

| SubframeConfigurationTDD | K according to subframe | | | | | | | | | |
|---|---|---|---|---|---|---|---|---|---|---|
| | n = 0 | n = 1 | n = 2 | n = 3 | n = 4 | n = 5 | n = 6 | n = 7 | n = 8 | n = 9 |
| 0 | | | | | | | | | | 4 |
| 1 | | | | 4 | | | | | | |
| 2 | | | | | | | | | 4, 9 | |
| 3 | | | | | 4, 9 | | | | | |
| 4 | | | | 4 | | | | | 4 | |
| 5 | | | 4 | | | | | | | |
| 6 | | | | | | | | 4 | | |
| 7 | | | | 4, 8 | | | | | | |
| 8 | | | | | | | | | 4, 8 | |
| 9 | | | 4, 8, 9 | | | | | | | |
| 10 | | | | | | | | 4, 8, 9 | | |
| 11 | | | | 4, 6 | | | | | | |

TABLE 2-continued

| | K according to subframe | | | | | | | | | |
|---|---|---|---|---|---|---|---|---|---|---|
| SubframeConfigurationTDD | n = 0 | n = 1 | n = 2 | n = 3 | n = 4 | n = 5 | n = 6 | n = 7 | n = 8 | n = 9 |
| 12 | | | | 4, 5, 6 | | | | | | |
| 13 | | | | 4 | | | | | | |
| 14 | | | | 4, 6 | | | | | | |
| 15 | | | | 4, 5 | | | | | | |
| 16 | | | | 4, 5, 6 | | | | | | |
| 17 | | | | 4, 5, 6, 9 | | | | | | |
| 18 | | | | | | 5 | | | | |

If CA is adopted for a backhaul link and UL-DL subframe configurations illustrated in [Table 1] apply to each cell (or each CC), a UL-DL subframe configuration may apply to every cell (or CC) independently, or the same UL-DL subframe configuration may apply to some cells (or CCs), while a UL-DL subframe configuration may apply to each of the remaining cells (or CCs) independently. A UL-DL subframe configuration may be indicated by SubframeConfigurationTDD or SubframeConfigurationFDD.

In this case, an HARQ timing mismatch between cells (or CCs) may make it impossible to transmit an uplink ACK/NACK or to retransmit a PUSCH. As a result, cross carrier scheduling may not be performed normally. This problem will be described below in detail with reference to the attached drawings.

Figure 9:
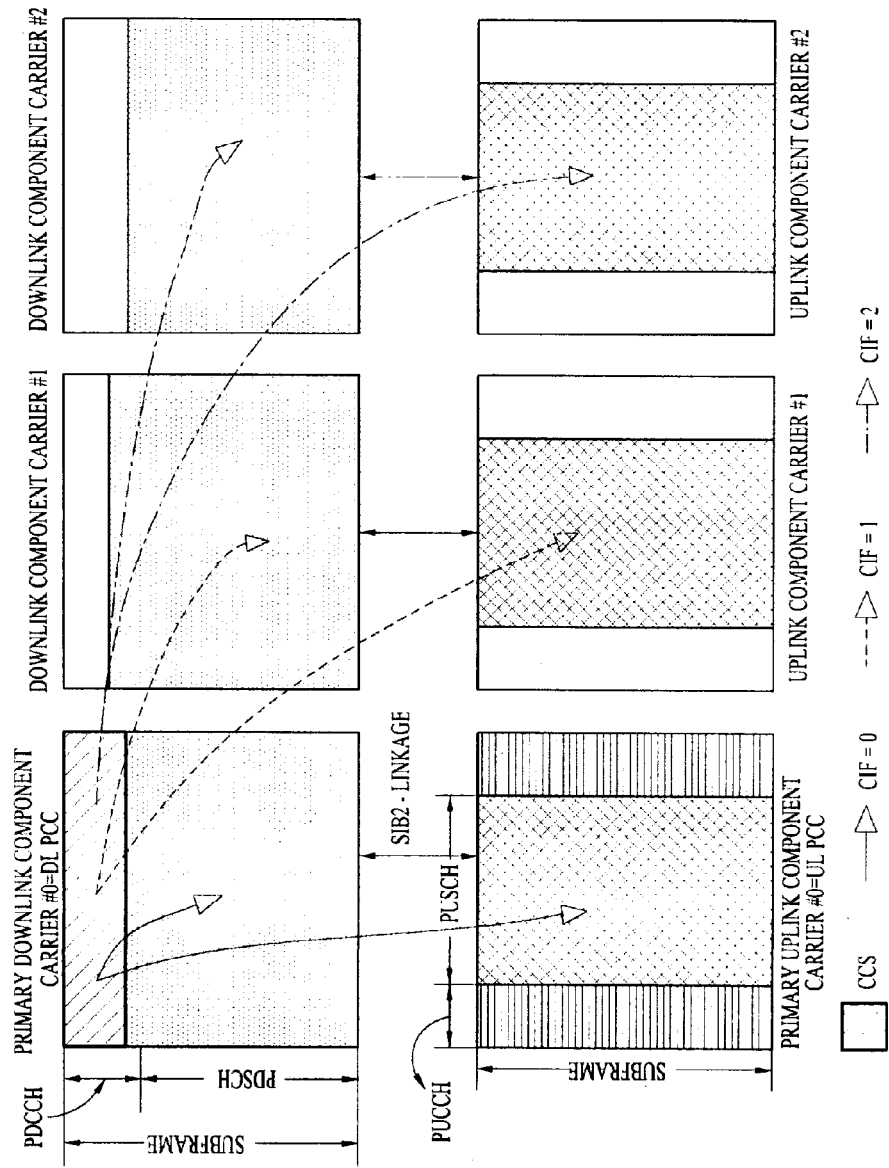
FIG. 9 illustrates an exemplary cross carrier scheduling scheme.

FIG. 9 illustrates an exemplary cross carrier scheduling scheme. Particularly, three cells (or CCs) are allocated to an RN and cross carrier scheduling is performed using a CIF in FIG. 9, as described before. Herein, it is assumed that DL Cell (or CC) #0 and UL Cell (or CC) #0 are a DL Primary Cell (DL PCell) or DL Primary CC (DL PCC) and a UL PCell or UL Primary CC (UL PCC), respectively and the other CCs are Secondary Cells (SCells) or Secondary CCs (SCCs).

Figure 10:
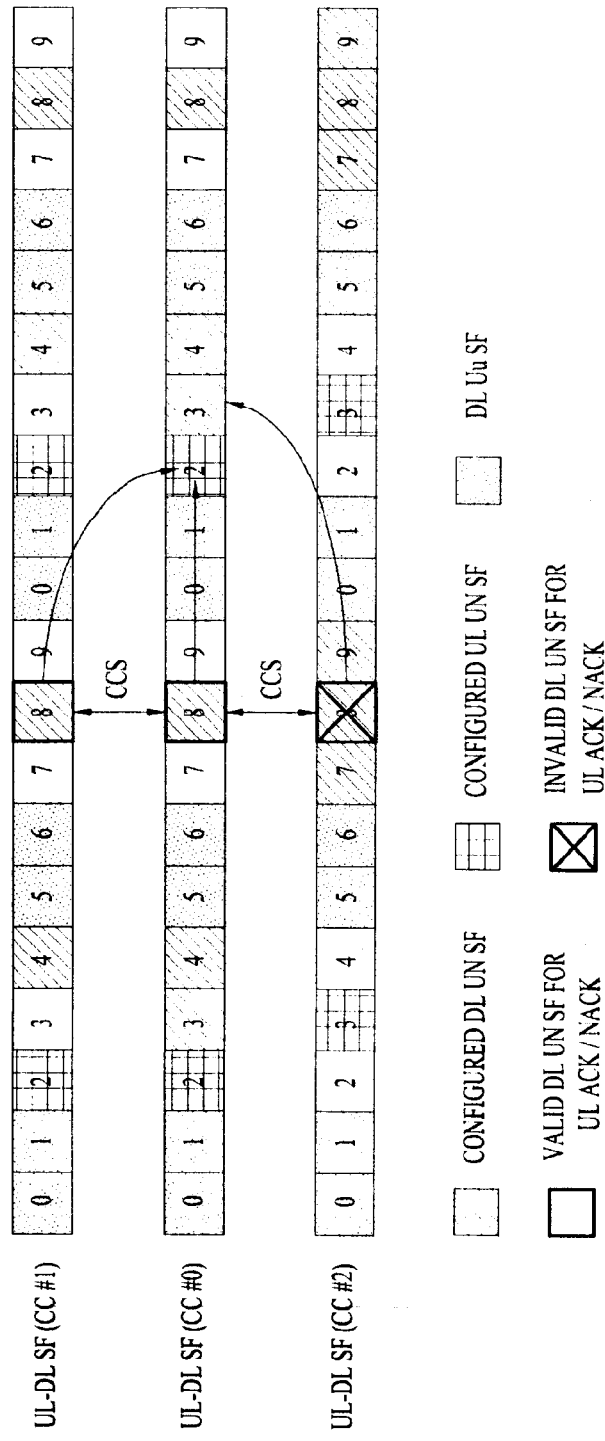
FIG. 10 illustrates a problem that may be encountered with cross carrier scheduling on a backhaul link in a Time Division Duplexing (TDD) system.

FIG. 10 illustrates a problem that may be encountered with cross carrier scheduling on a backhaul link in a TDD system. Particularly, FIG. 10 illustrates an HARQ timing mismatch, when a UL-DL subframe configuration is indicated to each cell independently by RRC signaling on a backhaul link and PDSCHs or PUSCHs of the PCells or PCCs and other SCells or SCCs are scheduled by a PCell or PCC in the situation of FIG. 9.

In FIG. 10, it is assumed that SubframeConfigurationTDD is set to "9", "7", and "12" for Cell (or CC) #0, Cell (or CC) #1, and Cell (or CC) #2, respectively. It is also assumed that an MeNB schedules PDSCHs of PCC #0, SCC #1, and SCC #2 in backhaul DL subframe #8 of PCC #0 by cross carrier scheduling.

Referring to FIG. 10, UL ACKs/NACKs for DL subframes #8 of PCC #0, SCC #1, and SCC #2 (i.e. PDSCHs) should be transmitted together in UL subframe #2 (i.e. on PUCCHs of UL subframe #2) of PCC #0 in a normal HARQ environment.

However, a UL ACK/NACK transmitting timing (i.e. UL subframe #3) for DL subframe #8 of SCC #2 is different from a UL ACK/NACK transmitting timing (i.e. UL subframe #2) for PCC #0 and SCC #1.

To effectively overcome an HARQ timing mismatch between cells or CCs caused by different UL-DL subframe configurations for the cells (or CCs) on a backhaul link, the following methods are proposed.

Embodiment 1

In an embodiment of the present invention, if CA applies to a backhaul link, the HARQ timing of an SCC follows that of a PCC. Specifically, an ACK/NACK for a PDSCH received in backhaul DL subframe #n of an SCC is transmitted in a backhaul UL subframe of a PCC, which has index #(n+k) (k is an integer equal to or larger than 4) closest to backhaul DL subframe #n, from among available backhaul UL subframes of the PCC.

Backhaul UL subframes and backhaul DL subframes are actually available subframes from among backhaul subframes allocated to each CC by RRC signaling (e.g. SubframeConfigurationTDD in a TDD system and SubframeConfigurationFDD in a FDD system). That is, only the remaining subframes except for access link subframes #0, #4, #5, and #9 among backhaul DL subframes indicated by an 8-bit bitmap are available as backhaul DL subframes in an FDD system.

More specifically, if the HARQ timing of an SCC follows the HARQ timing of a PCC, a UL-DL subframe configuration may be determined according to A) and B) in the embodiment of the present invention.

A) If CA applies to a backhaul link and N cells (or CCs) are allocated to a specific RN, a DL/UL subframe set of a subframe configuration allocated to PCells (i.e. DL CC #0 and UL CC #0) is defined as P (i.e. $P=S_0$), and a DL/UL subframe set of a subframe configuration allocated to SCell #k is defined as $S_k$ ($0<k\leq(N-1)$), a subframe configuration is determined for each cell (or CC) on the backhaul link such that $S_k \subset P$ ($0<k\leq(N-1)$).

$S_k \subset P$ may represent an inclusive relationship between the DL/UL subframe sets of a PCell and an SCell, an inclusive relationship between the UL subframe sets of the PCell and the SCell, or an inclusive relationship between the DL subframe sets of the PCell and the SCell.

Or $S_k \subset P$ may represent an inclusive relationship in terms of HARQ timing, that is, "UL ACK/NACK timing", "PHICH timing", or "UL ACK/NACK and PHICH timings". Further, $S_k \subset P$ may represent an inclusive relationship between the HARQ timings of the PCell and the SCell (i.e. between "the UL ACK/NACK timings", "PHICH timings", or "UL ACK/NACK and PHICH timings" of the PCell and the SCell) as well as the UL/DL subframe sets of the PCell and the SCell (or the UL or DL subframe sets of the PCell and the SCell). The inclusive relationship of HARQ timing may imply that the PCell can guarantee the HARQ timing of the SCell without any change or with a minimal change. For example, an SCell experiencing a change in HARQ timing may follow the HARQ timing of the PCell.

Only when a CC (or cell) having an SIB2 linkage between a DL CC and a UL CC is allocated to an RN, both DL and UL subframes may be allocated and otherwise, only DL or UL subframes may be allocated.

B) Aside from a UL-DL subframe configuration that can be allocated by A), a UL-DL subframe configuration satisfying a specific condition may be additionally allocated in the embodiment of the present invention.

The specific condition may be, for example, that backhaul DL subframes and backhaul UL subframes of different CCs are not overlapped at the same time points and the backhaul DL subframe set of an SCC is included in the backhaul DL subframe set of a PCC, in consideration of cross carrier scheduling.

[Table 3] below illustrates exemplary allocations of UL-DL subframe configurations (i.e. SubframeConfiguration-TDD) for each cell (or CC), respectively in scheme A) (i.e. the UL/DL subframe set of a PCell includes the UL/DL subframe set of an SCell and the PCell guarantees the UL ACK/NACK timing of the SCell without any special change) and in scheme B).

TABLE 3

| SubframeConfigurationTDD of PCell | SubframeConfigurationTDD candidates for SCell | |
|---|---|---|
| | Scheme A) | Scheme B) |
| 0 | 0 | — |
| 1 | 1, 13 | 18 |
| 2 | 0, 2 | 1, 3, 4, 13 |
| 3 | 1, 3, 13 | 0, 2, 4 |
| 4 | 0, 1, 4, 13 | 2, 3 |
| 5 | 5 | — |
| 6 | 6 | — |
| 7 | 5, 7 | — |
| 8 | 6, 8 | 18 |
| 9 | 5, 7, 9 | 6 |
| 10 | 6, 8, 10 | 5, 18 |
| 11 | 1, 11, 13, 14 | 18 |
| 12 | 1, 11, 12, 13, 14, 15, 16 | 5, 18 |
| 13 | 1, 13 | 18 |
| 14 | 1, 11, 13, 14 | 18 |
| 15 | 1, 13, 15 | 5, 18 |
| 16 | 1, 11, 12, 13, 14, 15, 16 | 5, 18 |
| 17 | 1, 3, 11, 12, 13, 14, 15, 16, 17 | 5, 7 |
| 18 | 18 | 1, 13 |

Figure 11:
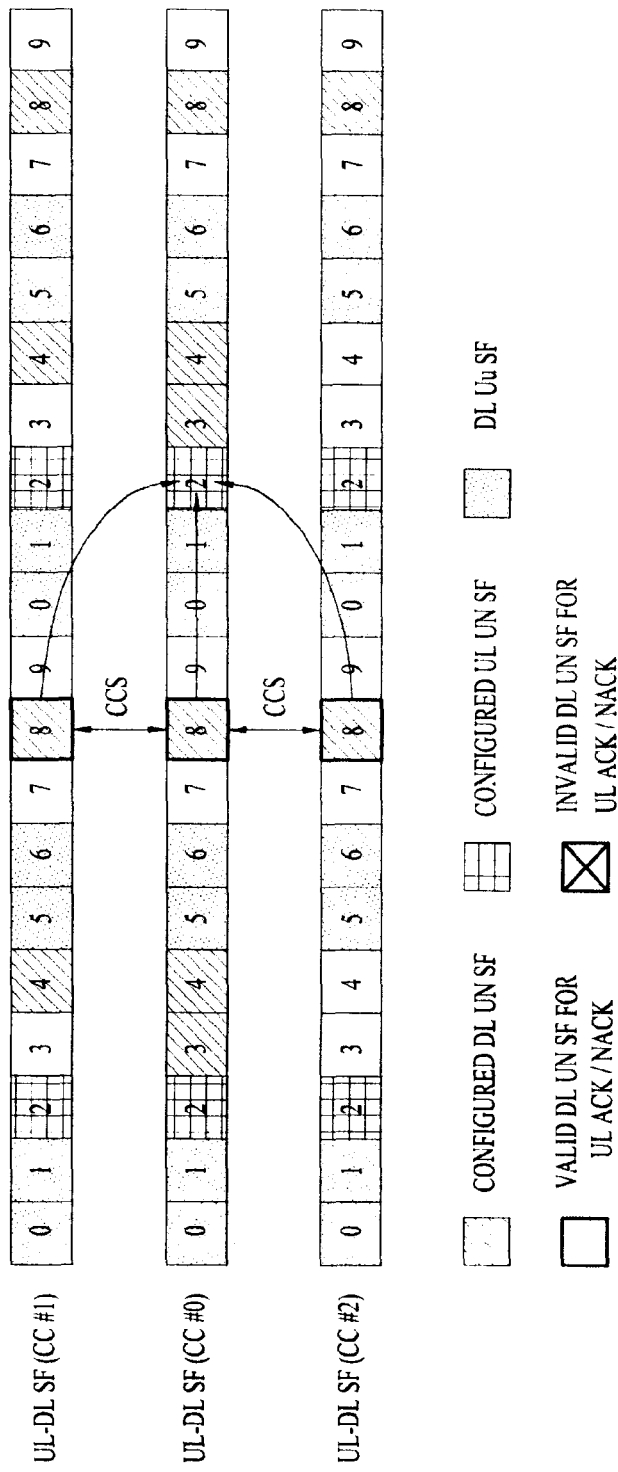
FIG. 11 illustrates exemplary subframe configurations for cross carrier scheduling according to an embodiment of the present invention.

FIG. 11 illustrates exemplary subframe configurations for cross carrier scheduling according to an embodiment of the present invention. In FIG. 11, subframe configurations are applied according to [Table 3] available in the embodiment of the present invention. Particularly, the embodiment of the present invention is applied to the same situation as illustrated in FIGS. 9 and 10 in FIG. 11. One thing to note herein is that SubframeConfigurationTDD is set to "9", "7", and "5" respectively for Cell (CC) #0, Cell (CC) #1, and Cell (CC) #2.

Referring to FIG. 11, since SubframeConfigurationTDD is set to 5 for Cell (or CC) #2 such that $S_2 \subset P$ and $S_1 \subset P$, a UL ACK/NACK transmission timing for DL CC #8 of Cell (or CC) #2 is the same subframe, UL subframe #2 for Cell (or CC) #0 and Cell (or CC) #1.

Therefore, UL ACKs/NACKs for PDSCHs transmitted in DL subframes #8 of Cell (or CC) #0, Cell (or CC) #1, and Cell (or CC) #2 may be transmitted together on a PUCCH of UL subframe #2 of Cell (or CC) #0.

Embodiment 2

If N cells (or CCs) are allocated to an RN in a TDD system, backhaul link subframe configurations (i.e. SubframeConfigurationTDD of [Table 1]) available to each cell (or CC) in the foregoing embodiment of the present invention may be limited to the same eNB-RN UL-DL configuration.

[Table 4] illustrates exemplary allocations of UL-DL subframe configurations to each cell (or CC) in a TDD system according to another embodiment of the present invention.

TABLE 4

| eNB-RN uplink-downlink configuration | SubframeConfigurationTDD of PCell | SubframeConfigurationTDD candidates for SCell | |
|---|---|---|---|
| | | Scheme A) | Scheme B) |
| 1 | 0 | 0 | — |
| | 1 | 1 | — |
| | 2 | 0, 2 | 1, 3, 4 |
| | 3 | 1, 3 | 0, 2, 4 |
| | 4 | 0, 1, 4 | 2, 3 |
| 2 | 5 | 5 | — |
| | 6 | 6 | — |
| | 7 | 5, 7 | — |
| | 8 | 6, 8 | — |
| | 9 | 5, 7, 9 | 6 |
| | 10 | 6, 8, 10 | 5 |
| 3 | 11 | 11, | — |
| | 12 | 11, 12 | — |
| 4 | 13 | 13 | — |
| | 14 | 13, 14 | — |
| | 15 | 13, 15 | — |
| | 16 | 13, 14, 15, 16 | — |
| | 17 | 13, 14, 15, 16, 17 | — |
| 6 | 18 | 18 | — |

An eNB may indicate a UL-DL (backhaul link) subframe configuration for each cell (or CC), determined according to the first and second embodiments of the present invention, to an RN by RN-specific higher-layer signaling, an SIB, or a physical layer signal, or may update the UL-DL (backhaul link) subframe configuration for each cell (or CC) (at every predetermined interval or at a specific time point).

Embodiment 3

As in the first embodiment of the present invention, if CA applies to a backhaul link, the HARQ timing of an SCC follows the HARQ timing of a PCC in a third embodiment of the present invention. In addition, scheme A) and/or scheme B) of the first embodiment of the present invention is applicable.

Specifically, if CA applies to a backhaul link, an ACK/NACK for a PDSCH received in backhaul DL subframe #n of an SCC is transmitted on a PCC according to an ACK/NACK transmission timing of backhaul DL subframe #m (m≥n) of the PCC closest to backhaul DL subframe #n of the SCC.

As described above, backhaul UL subframes and backhaul DL subframes refer to actually available subframes from among backhaul subframes allocated to each CC by RRC signaling (e.g. SubframeConfigurationTDD in a TDD system and SubframeConfigurationFDD in a FDD system). That is, only the remaining subframes except for access link subframes #0, #4, #5, and #9 among backhaul DL subframes indicated by an 8-bit bitmap are available as backhaul DL subframes in an FDD system.

Figure 12:
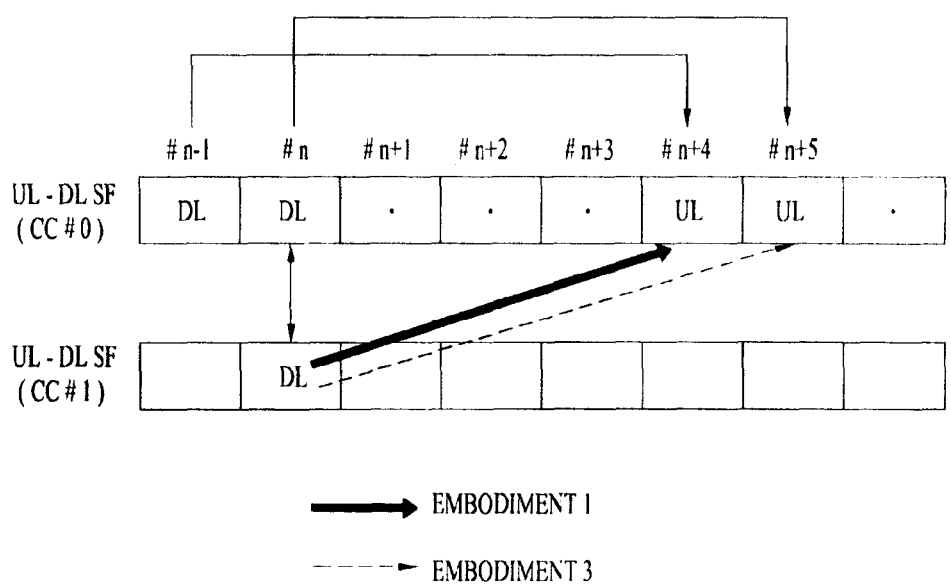
FIG. 12 illustrates exemplary subframe configurations for cross carrier scheduling according to a third embodiment of the present invention.

FIG. 12 illustrates an HARQ timing according to the third embodiment of the present invention. Particularly, the characteristics of the third embodiment of the present invention will be described in comparison with the first embodiment of the present invention with reference to FIG. 12. For the convenience of description, it is assumed that an ACK/

NACK for a PDSCH received in backhaul DL subframe #(n−1) of a PCC, CC #0 is transmitted in backhaul UL subframe #(n+4) and an ACK/NACK for a PDSCH received in backhaul DL subframe #n of the PCC, CC #0 is transmitted in backhaul UL subframe #(n+5).

Referring to FIG. 12, if an SCC, CC #1 is cross-carrier scheduled in backhaul DL subframe #n of CC #0, an HARQ timing for a PDSCH received in backhaul DL subframe #n of CC #1 may be different as follows in the first and third embodiments of the present invention.

In the first embodiment of the present invention, an ACK/NACK for a PDSCH received in backhaul DL subframe #n of an SCC is transmitted in a backhaul UL subframe of a PCC closest to backhaul DL subframe #n, satisfying the condition that the index of the backhaul UL subframe of the PCC is "UL Un SF #(n+k) (k is an integer equal to or larger than 4)" among available backhaul UL subframes of the PCC. The index of the backhaul UL subframe of the PCC that satisfies the above condition is #(n+4). That is, the ACK/NACK for the PDSCH received in backhaul DL subframe #n of the SCC is transmitted in backhaul UL subframe #(n+4) of the PCC.

On the other hand, in the third embodiment of the present invention, an ACK/NACK for a PDSCH received in backhaul DL subframe #n of an SCC is transmitted on a PCC according to an ACK/NACK transmission timing of backhaul DL subframe #m (m≥n) of the PCC, closest to backhaul DL subframe #n, among available backhaul UL subframes of the PCC. That is, the index of a backhaul DL subframe of the PCC closest to subframe #n carrying the PDSCH on the SCC is also #n. Therefore, the ACK/NACK for the PDSCH received in backhaul DL subframe #n of the SCC is transmitted in backhaul UL subframe #(n+5) of the PCC.

Additionally, when cross carrier scheduling is performed in backhaul DL subframe #m configured on a PCell, for PDSCH transmission on an SCell, DL subframes of each SCell subject to cross carrier scheduling may be limited to subframes as described in the followings (1) and (2).

(1) First of all, a DL subframe of each SCell subject to cross carrier scheduling may be limited to a DL subframe of the Scell configured at the same time point as backhaul DL subframe #m of a PCell. This constraint applies to both FDD and TDD systems. A UL ACK/NACK for a PDSCH transmitted on an SCell cross-carrier scheduled by the PCell is transmitted at a UL ACK/NACK transmission timing of backhaul DL subframe #m of the PCell on a UL PCC of the PCell.

(2) When cross carrier scheduling is performed in the TDD system, a DL subframe to carry a UL grant for each SCell is a DL subframe that can deliver a UL grant under a subframe configuration for the SCell, satisfying the constraint (1). In addition, a UL subframe (for PUSCH transmission) related to the DL subframe may be limited to a backhaul UL subframe. This is because the positions of UL subframes are fixed in each subframe configuration and thus PUSCH transmission is impossible if the above condition is not satisfied, in the TDD system.

On the contrary, a DL subframe for each cell, which can carry a UL grant and can be subject to cross carrier scheduling may be a DL subframe satisfying the constraint (1) in the FDD system. In this case, a UL-DL subframe configuration may be applied to every cell (or CC) independently, or the same UL-DL subframe configuration may be applied to some cells (or CCs), while UL-DL subframe configurations may be applied to the remaining cells (or CCs0 independently.

The embodiments of the present invention can be extended to both the TDD and FDD systems.

Further, the embodiments of the present invention can be extended to an environment where some of cells (or CCs) allocated to an RN are used in an 'in-band' fashion and the other cells are used in an 'out-band' fashion (i.e. Full Duplex) as well as an environment where all of cells (or CCs) allocated to an RN are used in the 'in-band' fashion or the 'out-band' fashion (i.e. Full Duplex).

The embodiments of the present invention can be extended to an access link between an RN and an RUE as well as a backhaul link between an MeNB and an RN. In addition, the embodiments of the present invention can be applied to an operation between an MeNB and an MUE. That is, all DL subframes may be DL subframe candidates for communication between an MeNB and an MUE in the FDD system, and the present invention can be extended to existing UL-DL subframe configurations listed in [Table 5] in the TDD system. Furthermore, the present invention can be extended, for example, to a dynamic subframe configuration that changes the usage of a specific subframe dynamically according to a traffic load change of a current system.

TABLE 5

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

If UL/DL communication cannot be conducted at a specific resource (time/frequency) position for various reasons, the present invention can be extended to solve the resulting HARQ problem (or the resulting CSI reporting problem).

For example, the present invention is applicable to a case where an Almost Blank Subframe (ABS) is used to cancel inter-cell interference during communication between a receiver and a transmitter, a case where different UL/DL subframe configurations apply to CCs used for the communication between the receiver and the transmitter, a case where each of the CCs has a different ABS configuration (specifically, communication between an eNB and an RN or between an RN and a UE), or a case where the usage of (predefined) specific resources between the receiver and the transmitter is changed (dynamically) according to the load state of a system.

Figure 13:
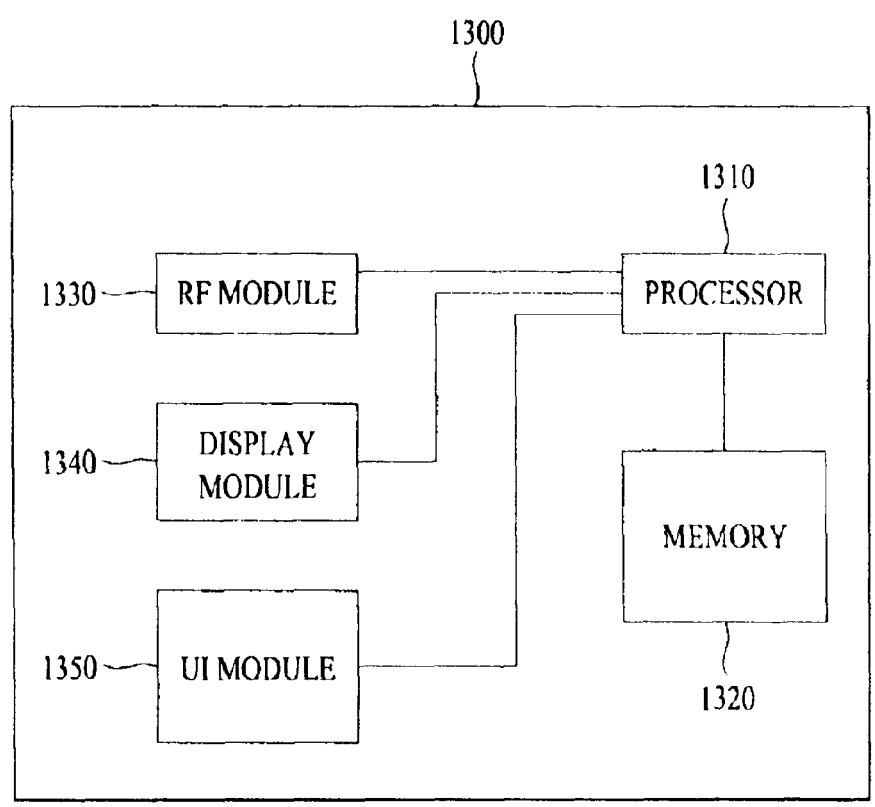
FIG. 13 is a block diagram of a communication apparatus according to an embodiment of the present invention.

FIG. 13 is a block diagram of a communication apparatus according to an embodiment of the present invention.

Referring to FIG. 13, a communication apparatus 1300 includes a processor 1310, a memory 1320, a Radio Frequency (RF) module 1330, a display module 1340, and a User Interface (UI) module 1350.

The communication device 1300 is shown as having the configuration illustrated in FIG. 13, for clarity of description. Some modules may be added to or omitted from the communication apparatus 1300. In addition, a module of the communication apparatus 1530 may be divided into more modules. The processor 1310 is configured to perform operations according to the embodiments of the present invention described before with reference to the drawings. Specifically, for detailed operations of the processor 1310, the descriptions of FIGS. 1 to 12 may be referred to.

The memory 1320 is connected to the processor 1310 and stores an Operating System (OS), applications, program codes, data, etc. The RF module 1330, which is connected to the processor 1310, upconverts a baseband signal to an RF signal or downconverts an RF signal to a baseband signal. For this purpose, the RF module 1330 performs digital-to-analog conversion, amplification, filtering, and frequency upconversion or performs these processes reversely. The display module 1340 is connected to the processor 1310 and displays various types of information. The display module 1340 may be configured as, not limited to, a known component such as a Liquid Crystal Display (LCD), a Light Emitting Diode (LED) display, and an Organic Light Emitting Diode (OLED) display. The UI module 1350 is connected to the processor 1310 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description has been mainly made of a data transmission and reception relationship between an RN and a BS. A specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an Advanced Base Station (ABS), an access point, etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the foregoing methods and apparatuses for configuring a backhaul link subframe in a wireless communication system using CA have been described in the context of a 3GPP LTE system, by way of example, they are also applicable to various other wireless communication systems.

The invention claimed is:

1. A method for processing signals at a user equipment (UE) in a TDD (Time Division Duplex) wireless communication system, the method comprising:
   receiving from a network, downlink control information via a primary cell and downlink data using the downlink control information via a secondary cell; and
   transmitting, to the network, uplink control information corresponding to the downlink data,
   wherein an uplink/downlink (UL/DL) configuration for the primary cell is different from an UL/DL configuration for secondary cell, and
   wherein a timing for transmitting the uplink control information is determined based on the UL/DL configuration for the primary cell.

2. The method of claim 1, wherein transmitting the uplink control information comprises:
   transmitting the uplink control information via the primary cell.

3. The method of claim 1, wherein the uplink control information includes acknowledgement/negative-acknowledgement (ACK/NACK) information corresponding to the downlink data.

4. The method of claim 1, wherein the downlink control information received via the primary cell includes scheduling information for the downlink data received via the secondary cell.

5. The method of claim 1 further comprising:
   receiving, via a Radio Resource Control (RRC) layer signaling from the network, information on the UL/DL configuration for the primary cell and the UL/DL configuration for the secondary cell.

6. A method for processing signals at a network in a TDD (Time Division Duplex) wireless communication system, the method comprising:
   transmitting, to a user equipment (UE), downlink control information via a primary cell and downlink data using the downlink control information via a secondary cell; and
   receiving, from the UE, uplink control information corresponding to the downlink data,
   wherein an uplink/downlink (UL/DL) configuration for the primary cell is different from an UL/DL configuration for secondary cell, and
   wherein a timing for receiving the uplink control information is determined based on the UL/DL configuration for the primary cell.

7. The method of claim 6, wherein receiving the uplink control information comprises:
   receiving the uplink control information via the primary cell.

8. The method of claim 6, wherein the uplink control information includes acknowledgement/negative-acknowledgement (ACK/NACK) information corresponding to the downlink data.

9. The method of claim 6, wherein the downlink control information transmitted via the primary cell includes scheduling information for the downlink data transmitted via the secondary cell.

10. The method of claim 6, further comprising:
   transmitting, via a Radio Resource Control (RRC) layer signaling to the UE, information on the UL/DL configuration for the primary cell and the UL/DL configuration for the secondary cell.

\* \* \* \* \*